US009262228B2

(12) United States Patent
Bond et al.

(10) Patent No.: US 9,262,228 B2
(45) Date of Patent: Feb. 16, 2016

(54) DISTRIBUTED WORKFLOW IN LOOSELY COUPLED COMPUTING

(75) Inventors: Barry Clayton Bond, Redmond, WA (US); Savas Parastatidas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 720 days.

(21) Appl. No.: 12/889,292

(22) Filed: Sep. 23, 2010

(65) Prior Publication Data

US 2012/0079490 A1    Mar. 29, 2012

(51) Int. Cl.
*G06F 9/46* (2006.01)
*G06F 9/50* (2006.01)

(52) U.S. Cl.
CPC ........ *G06F 9/5038* (2013.01); *G06F 2209/506* (2013.01)

(58) Field of Classification Search
None
See application file for complete search history.

(56) References Cited

U.S. PATENT DOCUMENTS

| 6,105,053 A * | 8/2000 | Kimmel et al. ............... 718/105 |
| 2006/0212932 A1 | 9/2006 | Patrick et al. |
| 2008/0240119 A1 | 10/2008 | Wylie et al. |
| 2009/0210876 A1* | 8/2009 | Shen et al. .................... 718/100 |
| 2009/0216910 A1 | 8/2009 | Duchesneau |
| 2011/0099553 A1* | 4/2011 | Agarwal et al. ............... 718/105 |

OTHER PUBLICATIONS

Distributed Computing in Practice: the Condor Experience (Thain et al), 2005.*
"TIBCO ActiveSpaces", Retrieved at, retrieved date: Jul. 9, 2010, p. 1, retrieved date Jul. 8, 2010.
Jacobs, Dean, "Distributed Computing with BEA WebLogic Server", Retrieved at, Proceedings of the 2003 CIDR Conference, pp. 11, retrieved date Jul. 8, 2010.
Ranjan, et al., "Decentralized Overlay for Federation of Enterprise Clouds", Retrieved at, pp. 191-217, retrieved Jul. 8, 2010.
Varia, Jinesh, "Architecting for the Cloud: Best Practices", Retrieved at, May 2010, p. 1-21.
"Boosting performance of SOA applications", Retrieved at, p. 1-7, retrieved date Jul. 8, 2010.
Hoheisel, A., "Workflow Managment for Loosely Coupled Simulations", pp. 6, retrieved date Oct. 20, 2007.
Colan, Mark, "Service-Oriented Architecture expands the vision of Web services, Part 1", Apr. 21, 2004, pp. 5.

(Continued)

*Primary Examiner* — Mengyao Zhe
(74) *Attorney, Agent, or Firm* — Kevin Sullivan; Doug Barker; Micky Minhas

(57) ABSTRACT

A method that can be used in a distributed workflow system that uses loosely coupled computation of stateless nodes to bring computation tasks to the compute nodes is disclosed. The method can be employed in a computing system, such as cloud computing system, that can generate a computing task separable into work units and performed by a set of distributed and decentralized workers. In one example, the method arranges the work units into a directed acyclic graph representing execution priorities between the work units. The plurality of distributed and decentralized workers query the directed acyclic graph for work units ready for execution based upon the directed acyclic graph. In one example, the method is included in a computer readable storage medium as a software program.

20 Claims, 5 Drawing Sheets

(56) References Cited

OTHER PUBLICATIONS

A novel approach to resource scheduling for parallel query processing on computational grids Paton et al, May 25, 2006, Pringer Science.*

Green, Daron, "Scientific Infrastructure", Retrieved at, pp. 66, retrieved date Jul. 8, 2010.

"Workflow engine", Published Jun. 10, 2010, p. 1.

"What is Condor?", Retrieved at << http://www.cs.wisc.edu/condor/description.html >>, Published Jul. 6, 2008, pp. 2.

Mehta, et al., "Pegasus and Condor", Retrieved at, retrieved date: Jul. 8, 2010, p. 1-16.

* cited by examiner

DISTRIBUTED WORKFLOW IN LOOSELY COUPLED COMPUTING

BACKGROUND

A distributed computer system includes multiple autonomous computers that communicate with each other through a computer network. The computers interact with each other in order to achieve a common goal, and a problem is divided into many tasks, which are distributed across the nodes of the computer system. Often, the distributed computer system is able to concurrently process several computations and to run parallel computer applications on its nodes. Cloud computing is a form of a distributed computer system.

Cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing is a model for enabling convenient, on-demand network access to a shared pool of configurable computing resources (e.g., networks, servers, storage, applications, and services) that can be rapidly provisioned and released with minimal management effort or service provider interaction. Details of the cloud are abstracted from the users, or clients, who can have little if any expertise in, or control over, the technology infrastructure in the cloud that supports them. Cloud computing describes a supplement, consumption, and delivery model for IT services based on the Internet, and it typically involves over-the-Internet provision of dynamically scalable and often virtualized resources.

Cloud computing includes the potential to provide capabilities that can be rapidly and elastically provisioned, in some cases automatically, to scale out and rapidly released to quickly scale in. Work in the cloud is performed with typical workflow engines. Typical workflow engines, however, can have a limited scaling capability, a limited capacity for complexity, and a reliance on a small set of hardware thus providing susceptibility to failure.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a method that can be used in a distributed workflow system that uses loosely coupled computation of stateless nodes to bring computation tasks to the compute nodes. The method can be employed in a computing system, such as cloud computing system, that can generate a computing task separable into work units and performed by a set of distributed and decentralized workers. In one example, the method arranges the work units into a directed acyclic graph representing execution priorities between the work units. The plurality of distributed and decentralized workers query the directed acyclic graph for work units ready for execution based upon the directed acyclic graph. In one example, the method is included in a computer readable storage medium as a software program.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Figure 1:
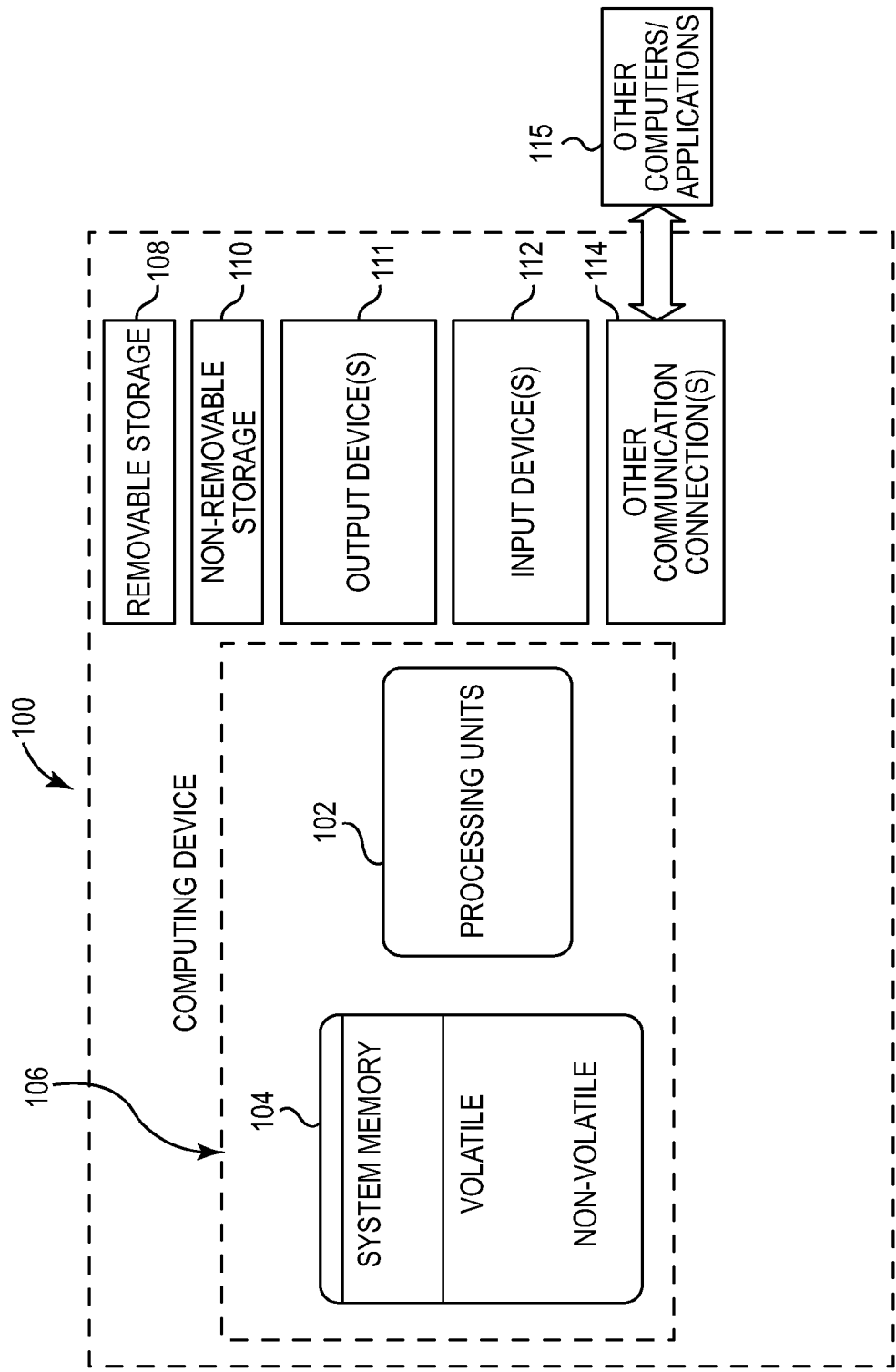
FIG. 1 is a block diagram illustrating an example computing device.

FIG. 1 illustrates an exemplary computer system that can be employed as an operating environment for a developer tool for analyzing and visualizing resource utilization of a distributed system, or the computer system can be included as an example of a computing device in a distributed computer system. The exemplary computer system includes a computing device, such as computing device 100. In a basic configuration, computing device 100 typically includes a processor architecture having one or more processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context includes the thread's set of machine registers, the kernel stack, a thread environmental block, and a user stack in the in the address space of the process corresponding with the thread. In parallel applications, threads can be concurrently executed on the processor 102.

A multiple core processor can be implemented as the processor 102 in the computing device 100 to concurrently execute threads within the computing device 100. One example includes multiple cores implemented on a single die. Other examples are contemplated where the processor 102 exists on separate chips or other configurations. In some architectures, the processors can exist on separate machines such as in a cloud, a cluster, a grid, or other forms of distributed computing. Further, each physical core can capable of efficiently and concurrently executing multiple threads of a concurrent process. Such physical cores are often referred to as "Simultaneous Multi-Threading," or often simply "SMT," cores, and the concurrently executed threads on each physical core share hardware resources included within the single physical core. Each physical core capable of multithreading can present the operating system with as many logical cores as concurrently executing threads it supports. The systems and methods described below, however, are not limited to a particular architecture.

Figure 2:
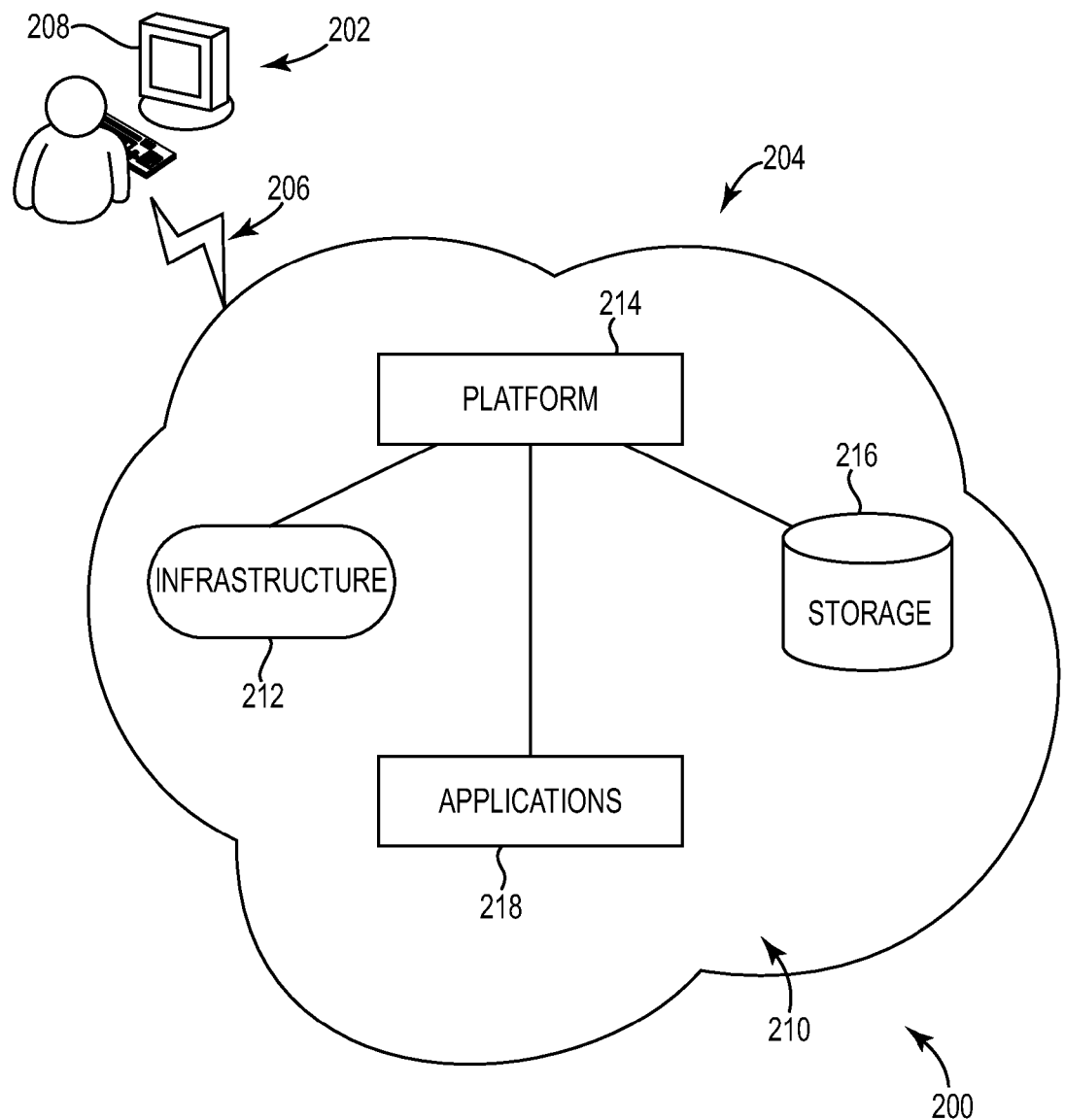
FIG. 2 is a schematic diagram illustrating an example distributed computing system, such as a cloud computing system, including computing devices of FIG. 1 coupled together on through a network.

FIG. 2 is a schematic diagram illustrating an example distributed computing system, such as cloud computing system 200. The description of the cloud computing system is for illustrative purposes, and the distributed computing system for use with this disclosure also can be a grid, a cluster, or the like, and is not intended to be limited to a single form of distributed computing system in this disclosure or the claims. The cloud computing system 200 includes a front end 202, often referred to as an on-premises client, and a back end 204, often referred to as the cloud. The front end 202 and the back end 204 are coupled together through a network 206, such as the Internet. The front end 202 includes one or more client devices 208 that can be constructed in accordance with computing device 100 in one example. Each of the client devices 208 includes an application (not shown) running on the client device 208 to permit access the cloud computing system 200. In one example, the application can be a general-purpose web browser, or the application can be a particular application having availability limited to clients of a particular cloud system. The back end 204 includes computing devices including servers and data storage systems coupled together to create the cloud portion of computing services. The cloud computing system 200 can include various types of cloud computing systems such as public clouds, on-premise clusters, private clouds, and the like.

In one example, a cloud architecture 210 includes an infrastructure 212, an application platform 214 (sometimes referred to as Platform as a Service or PaaS), storage 216, and applications 218, which permits the client to access systems and information with out having to purchase or maintain the underlying software and hardware used to perform the services of the back end 204. Most cloud computing infrastructures consist of services delivered through common centers and built on servers. The application platform 214 allows applications to be hosted and run at one or more typically remote datacenters. In one example, the datacenters can themselves include forms of distributed computing such as computing clusters and storage. The application platform 214 can also provide a cloud operating system that serves as a runtime for the applications and provides a set of services that allows development, management and hosting of applications off-premises. Services and applications 218 built using the platform 214 or for the platform 214 can run on top of the operating system. An example operating system for the cloud system is available under the trade designation Windows Azure, available from Microsoft, Inc. of Redmond Wash. Another example of a operating system for other forms of distributed computing is available under the trade designation Windows HPC Server, also available from Microsoft, Inc.

Generally, the operating system can include three components including compute, storage, and host. Compute provides a computation environment, and storage provides scalable storage, such as tables, queue, and so on, for large scale needs. The host environment can pool individual systems into a network for managing resources, load balancing, other services for the applications, and the like without using the hosted applications 218 to explicitly perform those functions.

Some distributed computing systems, such as cloud computing systems 200 as well as others, encourage the use of loosely coupled computation using stateless nodes. Typical workflow engines that are used to manage or orchestrate tasks by responding to change and handling failure/retry, however, are typically implemented as stateful programs executing on a single node or a centralized collection of at least one node (but sometimes a few strongly coupled nodes), which can be referred to as head node.

Some typical workflow engines are able to support high-availability through replication and shared storage, but this centralization of workflow control in the head node places upper bounds on how far a workflow can scale, how complex the workflow can be, and how reliable it can be executed. For example, a head node can often provide bottlenecks. Centralized systems often suffer from performance bottlenecks because a single node tracks the state of the distributed system, such as the job scheduler and node health monitoring. In addition, if the head node fails, the system can become headless and may not function. Centralized systems can assume nodes are available for performing work. If a node fails, an entire distributed computation may be lost, such as message passing interface (MPI) programs. Cloud computing, as well as other forms of distributed, are able to accommodate programs that can continue even if nodes crash or disappear. Performance can improve as new nodes come online. Despite these issues, centralization of workflow control remains the focus of development in these distributed computing systems, and there is much inertia to build centralized work schedulers that can scale and address complex workflow systems. For example, reliability is addressed through maintaining a head node structure but introducing redundancy in hardware.

Figure 3:
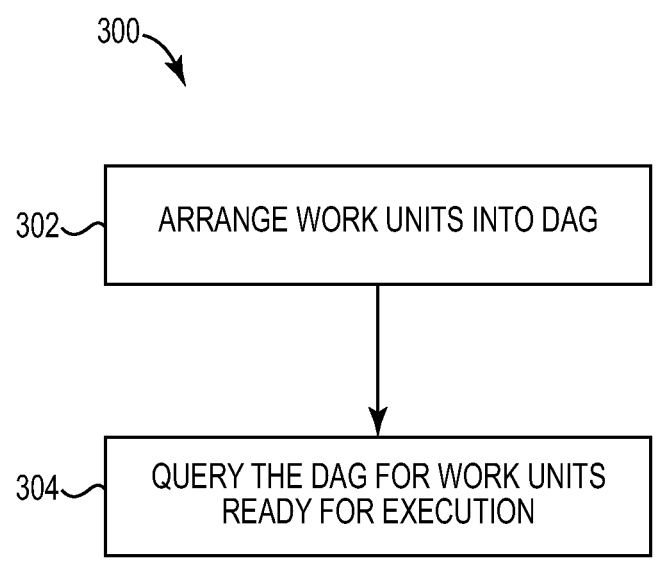
FIG. 3 is a block diagram illustrating an example method for use with the distributed computing system of FIG. 2.

FIG. 3 illustrates an example method 300, which can be used as a distributed workflow system that uses loosely coupled computation of stateless nodes to bring computation tasks to the compute nodes. The method can be employed in a system, such as cloud computing system, that can generate a computing task separable into work units and performed by a set of distributed and decentralized workers. In one example, the method 300 arranges the work units into a directed acyclic graph representing execution priorities between the work units at 302. In one example, the execution priorities are based on at least dependencies between the work units. The distributed and decentralized workers query the directed acyclic graph for work units ready for execution based upon the directed acyclic graph at 304. A workflow engine can place localized data for decision making into the directed acyclic graph, and the workflow engine does not reconstruct a global workflow state at each point of execution. The method allows for higher-scale workflow engines as compared to centralized workflow engines in that fewer bottlenecks occur around input/outputs and storage.

A work unit is a unit of work that can be scheduled for execution on a worker. The work unit can represent a managed assembly/object reference with associated parameters, or a child process to spawn. The work unit also specifies security information such as an identifier representing the user that creates the work unit, machine recommendations, and a retry policy in case of failure. A directed acyclic graph representing dependencies between work units is referred to as a work unit context. This graph expresses allowable parallelism between unrelated work units.

A directed acyclic graph, often abbreviated as DAG, is a directed graph with no directed cycles. That is, it is formed by a collection of vertices and directed edges, each edge connecting a vertex to another, such that there is no way to start at any selected vertex in the graph and follow a sequence of edges that eventually loops back to the selected vertex. The vertices of the directed acyclic graph represent work units in which information and work flows in a consistent direction through the job. Thus, the directed acyclic graph represents at least a partial ordering of the work units. In some examples, a distributed acyclic graph can have many valid orderings of execution. For example, a first vertex can depend on execution of two or more other vertices. The order of the execution of the two or more other vertices can be irrelevant as long as they are completed before the first vertex begins execution.

Coupling refers to the degree of direct knowledge that one class has of another, such as one class's knowledge of other class itself. The dependent class's dependency is to a "contract" specified by the interface; a defined list of methods, properties, or both that implementing classes provide. Classes that implement the interface can satisfy the dependency of a dependent class without having to change the class. A new class implementing an interface can be written to replace a current dependency in at least some situations, without a change to the dependent class, i.e., the new and old classes can be easily interchanged. For example, in a service oriented architecture, services comprise unassociated, loosely coupled units of functionality that have no calls to each other embedded in them. Each service implements an action, such as filling out an online application for an account, or viewing an online bank-statement, or placing an online booking or airline ticket order. Instead of services embedding calls to each other in their source code they use defined protocols that describe how services pass and parse messages, using description metadata.

Figure 4:
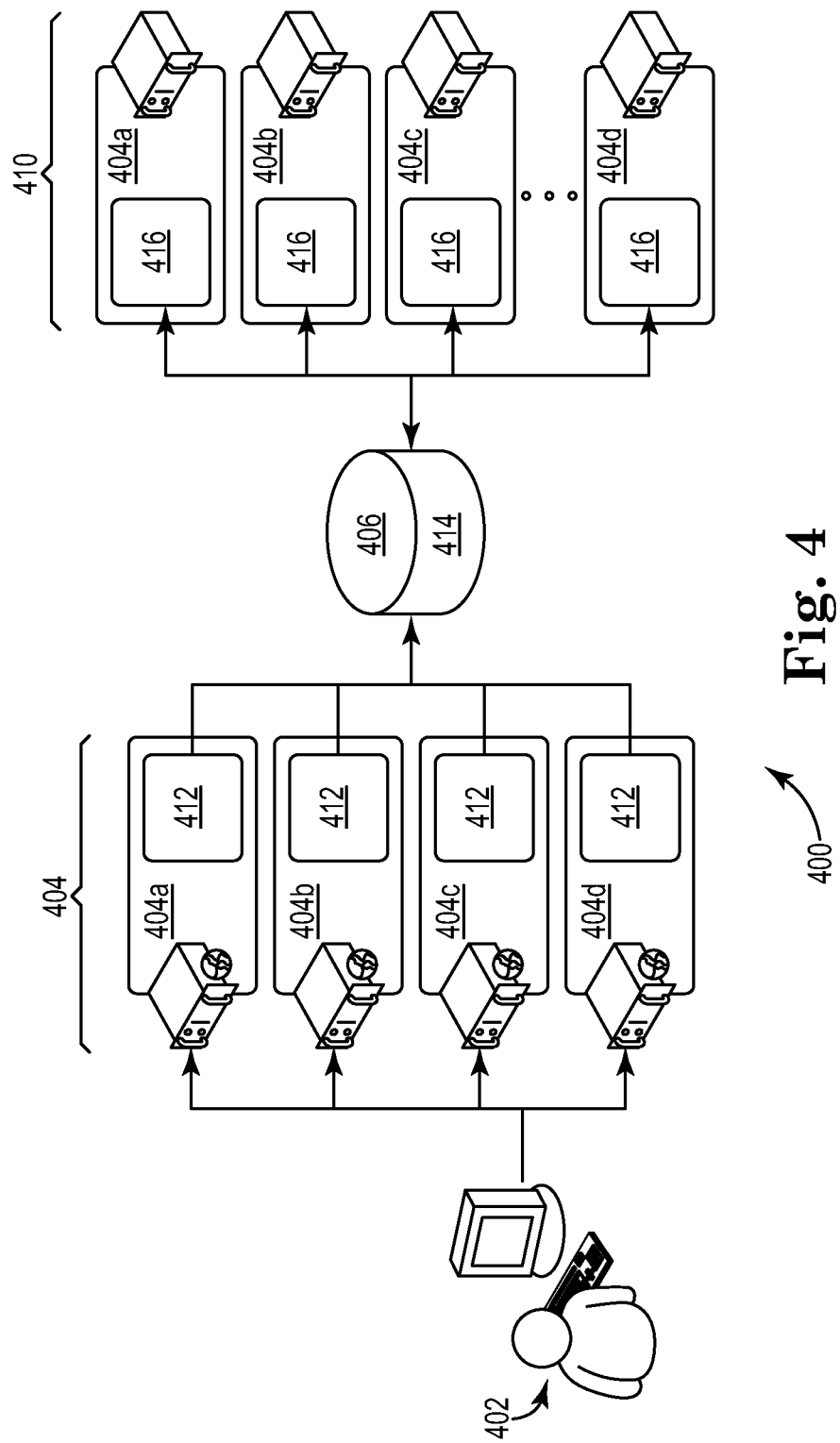
FIG. 4 is schematic diagram illustrating an example architecture of a distributed computing system for performing the method of FIG. 3.

FIG. 4 illustrates an example distributed system 400 implementing the method 300, such as a work balancer application. As illustrated, one or more users and administrators 402 in the front end can access the distributed computing environment of the distributed system 400 and are coupled to the implementation through a network. The user 402 can access a plurality of services 404, such as servers or other resources in the cloud 404a, 404b, 404c, 404d for services in the cloud. The services 404 are also coupled to a work queue 406, which includes the directed acyclic graph configured receives and order work units from the services 404. Services can be performed as web services or as other services built on remote procedure call (RPC). The work queue 406 is also coupled to a plurality of decentralized and distributed workers 410, such as generally similar computing nodes 410a, 410b, 410c, 410d assigned to participate in the work balancer application. The work queue 406 is also configured to allow the workers 410 to remove work units from the work queue 406 with a work stealing algorithm and to execute the work units.

The work balancer application implemented on the system 400 generally includes three stages, i.e., submission code 412, scheduling code 414, and querying code 416. The submission code 412 of the work balancer application is included on at least some of the services 404. The submission code 412 is configured to apply interfaces, such as application programming interfaces when called, so the work units and work unit context can be provided to the queue 406. The scheduling code 414 is largely included and performed at the work queue 406, and it is called to create the directed acyclic graph in a reliable form of storage, such as the table referred to above in the description of FIG. 3. The work queue 406 often does not include a first-in first-out method of handling storage, but instead arranges the work units according to the work unit context, which can be based on priorities such as execution dependencies or other priorities. The querying code 416 is included and performed on at least some of the distributed workers 410, and it is called to steal work units from the work queue 406 and then to execute the work units.

In one example, a work stealing algorithm is performed along with the scheduling code 414. The work balancer application is configured to allow idle workers 410 to query the work queue 406 for eligible work units to steal an eligible work unit for execution. Because the workers 410 and work queue 406 are loosely coupled to each other, typically no other system other than a specific worker, such as worker 410a, and the work queue 406 is aware of the work unit on the worker 410a. The work unit can include a retry policy that dictates what happens if execution fails or is canceled. When a worker 410 steals a work unit from the work queue 406, scheduling code 414 can flag the work unit as taken in the work queue 406. The worker 410 executes the work unit until it is executed, cancelled, or has failed. If the work unit is executed, the flag and the work unit can be removed from the work queue 406. The retry policy can dictate to the worker 410 what to do if the execution has canceled or failed. If, after a selected amount of time, the worker 410 has not finished executing the work unit, the work queue 406 can remove the flag and assume execution has failed (such as from a defective worker 410) or has been canceled. The retry policy can also dictate to the work queue what to do if the execution has canceled or failed, such as to make the work unit eligible to be stolen, or otherwise.

The directed acyclic graph also can be altered as work units within the graph invoke the workflow engine. For example, a first work unit of a workflow engine can depend on a second work unit and a second work unit. After the second and third work units are complete, the first work unit is stolen and executed. The work flow engine looks at the results generated by the second and third work units and determines whether they are acceptable. If they are acceptable, the work flow engine reports success back to the work balancer application and the first work unit completes successful. If the results are unacceptable, however, the work flow engine can create one or more new work units, that perform tasks such as creating a trouble ticket for the system administrator or re-scheduling the second and third work units to re-run against updated data.

Figure 5:
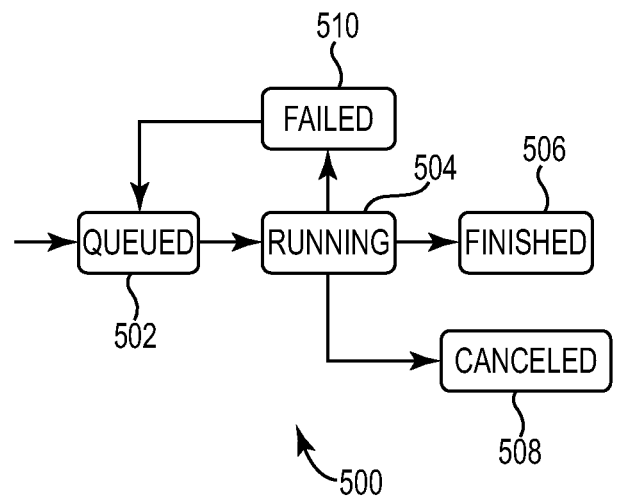
FIG. 5 is a schematic diagram illustrating a state device for use in the method of FIG. 3.

FIG. 5 illustrates an example state machine 500 representing an individual work unit. The work unit is queued at 502 until it is stolen. The work unit then begins executing or running at 504 on the worker 410. After the work unit has completed running, the work unit can be included into one of three states. The finished state at 506 represents an acceptably executed work unit. The cancelled state at 508 represents a work unit that has been stopped for some reason. The failed state at 510 represents an unacceptably executed work unit. Depending on the retry policy, the work unit in the failed state 510 can be returned to the work queue. The work unit context can also include a retry policy. For example, for a dependent work unit that is canceled or failed, the retry policy can dictate whether to return the work unit to the work queue 406, continue without the work unit, begin the work process again, or to abort the work process altogether.

As illustrated, the work balancer application does not operate in a centralized or tightly coupled form. Instead, the work balancer application is distributed on many devices in the distributed computing environment so if one device fails, the work balancer application can continue executing. In one example, the work balancer application can be included as part of the operating system, or, in another example, the work balancer can be configured as a layer on top of the operating system and below the services applications.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of performing a computing task separated into work units using a set of workers, comprising:
receiving the work units into a queue from a plurality of services, wherein each of the services provides interfaces associated with the work units regarding the work units and work unit context expressing dependencies between work units;
arranging the work units in the queue into a directed acyclic graph representing execution priorities between the work units based on the interfaces regarding the work units and the work unit context and allowing parallelism between unrelated work units;
allowing the workers to independently query the directed acyclic graph for work units including execution dependencies having a work unit on which another work unit depends that are ready for execution based upon the directed acyclic graph, the workers are decentralized so as to be independent of a head node structure;
allowing a worker of the plurality of workers to steal and execute a work unit ready for execution such that other workers of the plurality of workers are unaware of the execution of the work unit on the worker;
setting a flag to indicate the stolen work unit as taken in the queue;
removing the flag and the stolen work unit from the queue after the stolen work unit is acceptably executed; and
altering the directed acyclic graph when the work unit on which the another work unit depends is incorrectly executed so that the work unit on which the another work unit depends is rescheduled for execution.

2. The method of claim 1 wherein execution priorities are based on dependencies between work units.

3. The method of claim 2 wherein the directed acyclic graph enables parallel and sequential execution of work units.

4. The method of claim 1 wherein the directed acyclic graph represents at least a partial ordering of work units for execution.

5. The method of claim 1 wherein the work unit includes an executable application, arguments, and scheduling information.

6. The method of claim 1 wherein a plurality of services provide work units to the directed acyclic graph.

7. The method of claim 1 wherein the querying the directed acyclic graph includes stealing the work units ready for execution from the directed acyclic graph by distributed and decentralized workers.

8. The method of claim 1 wherein each work unit includes a retry policy in case the work unit is canceled or execution fails.

9. The method of claim 8 wherein a failed execution results in returning the work unit to the directed acyclic graph as a work unit ready for execution.

10. A computer readable memory storing computer executable instructions for controlling a computing device to perform a method of performing a computing task separated into a plurality of work units using a set of workers, the method comprising:
receiving the work units into a queue from a plurality of services, wherein each of the services provides interfaces associated with the work units regarding the work units and work unit context expressing dependencies between work units;
arranging the work units in the queue into a directed acyclic graph representing execution priorities between the work units based on the interfaces regarding the work units and the work unit context and allowing parallelism between unrelated work units;

allowing the workers to query the directed acyclic graph for work units including execution dependencies having a work unit on which another work unit depends that are ready for execution based upon the execution priorities of the directed acyclic graph, the workers are decentralized so as to be independent of a head node structure; and allowing a worker of the workers to steal and execute a work unit ready for execution such that other workers of the plurality of workers are unaware of the execution of the work unit on the worker;

setting a flag to indicate the stolen work unit as taken in the queue;

removing the flag and the stolen work unit from the queue after the stolen work unit is acceptably executed; and altering the directed acyclic graph when the work unit on which the another work unit depends is incorrectly executed so that the work unit on which the another work unit depends is rescheduled for execution.

11. The computer readable memory of claim 10 having submission instruction for providing work from services as the work units into a work queue containing the directed acyclic graph.

12. The computer readable memory of claim 11 wherein the services are web services in a cloud computing system.

13. The computer readable memory of claim 11 having scheduling instructions in the work queue for arranging the plurality of work units into the directed acyclic graph.

14. The computer readable memory of claim 13 wherein the work queue is included in a storage medium operably coupled to a cloud data center.

15. The computer readable memory of claim 13 having execution instruction for distributing and executing work units ready for execution among distributed and decentralized workers.

16. The computer readable memory of claim 15 wherein instructions for distributing and executing work units includes a work stealing application for stealing work units from the work queue for execution by one of the workers.

17. The computer readable memory of claim 16 wherein if the one of the worker fails in executing the work unit, the work unit is returned to the work queue as ready for execution.

18. The computer readable memory of claim 16 wherein a worker has a selected amount of time after the worker steals the work unit to complete execution of the work unit before the work units becomes ready of execution in the work queue.

19. A computer readable memory storing computer executable instructions for controlling a computing device configured to perform a method of performing a computing task separated into work units using a set of workers in a distributed computing environment, the method comprising:

receiving the work units into a queue from a plurality of services, wherein each of the services provides interfaces associated with the work units regarding the work units and work unit context expressing dependencies between work units;

arranging the work units in the queue into a directed acyclic graph representing execution dependencies between the work units for storage based on the interfaces regarding the work units and the work unit context and allowing parallelism between unrelated work units;

allowing the workers to query the queue for work units including execution dependencies having a work unit on which another work unit depends that are ready for execution based upon the directed acyclic graph, the workers are decentralized so as to be independent of a head node structure;

allowing a worker of the workers to steal a work unit ready for execution;

setting a flag to indicate the stolen work unit as taken in the queue;

removing the flag and the stolen work unit from the queue after the stolen work unit is acceptably executed;

executing the work unit on which the another work unit depends such that other workers of the plurality of workers are unaware of the execution of the work unit on the worker; and altering the directed acyclic graph when the work unit on which the another work unit depends is incorrectly executed so that the work unit on which the another work unit depends is rescheduled for execution.

20. The computer readable memory of claim 19 wherein services are used to provide the plurality of work units to the queue and a work stealing algorithm is used to steal work units from the queue for execution on one of the plurality of decentralized and distributed workers.

* * * * *